United States Patent [19]

Yum

[11] 4,258,588
[45] Mar. 31, 1981

[54] DIFFERENTIAL TRANSMISSION WITH LIMITED TORQUE TRANSMITTER

[76] Inventor: Robert S. Yum, 781 La Alondra Way, Gilroy, Calif. 95020

[21] Appl. No.: 20,974

[22] Filed: Mar. 16, 1979

[51] Int. Cl.³ .............................................. F16H 1/44
[52] U.S. Cl. .................................... 74/710.5; 74/711
[58] Field of Search ................ 74/710.5, 711; 180/75; 192/109 A

[56] References Cited

U.S. PATENT DOCUMENTS

| | | | |
|---|---|---|---|
| 2,375,938 | 5/1945 | Moon | 74/711 |
| 3,186,258 | 6/1965 | Meldola | 74/710.5 |
| 3,762,503 | 10/1973 | Wilder et al. | 74/711 X |
| 4,154,326 | 5/1979 | Wolf | 74/710.5 X |

*Primary Examiner*—Louis Rimrodt
*Attorney, Agent, or Firm*—Phillips, Moore, Weissenberger, Lempio & Majestic

[57] ABSTRACT

A differential transmission including a rotatable casing, a pair of pinion gears coupled to the casing, a pair of side gears engaged with the pinion gears, a pair of wheel axles engaged with the side gears, and a limited torque transmitter, in the form of a rotary pump, which pumps the transmission fluid. The torque transmitter develops internal torsional resistance only when the differential speed ratio of the axles exceeds a predetermined value, such as when one wheel slips.

4 Claims, 4 Drawing Figures

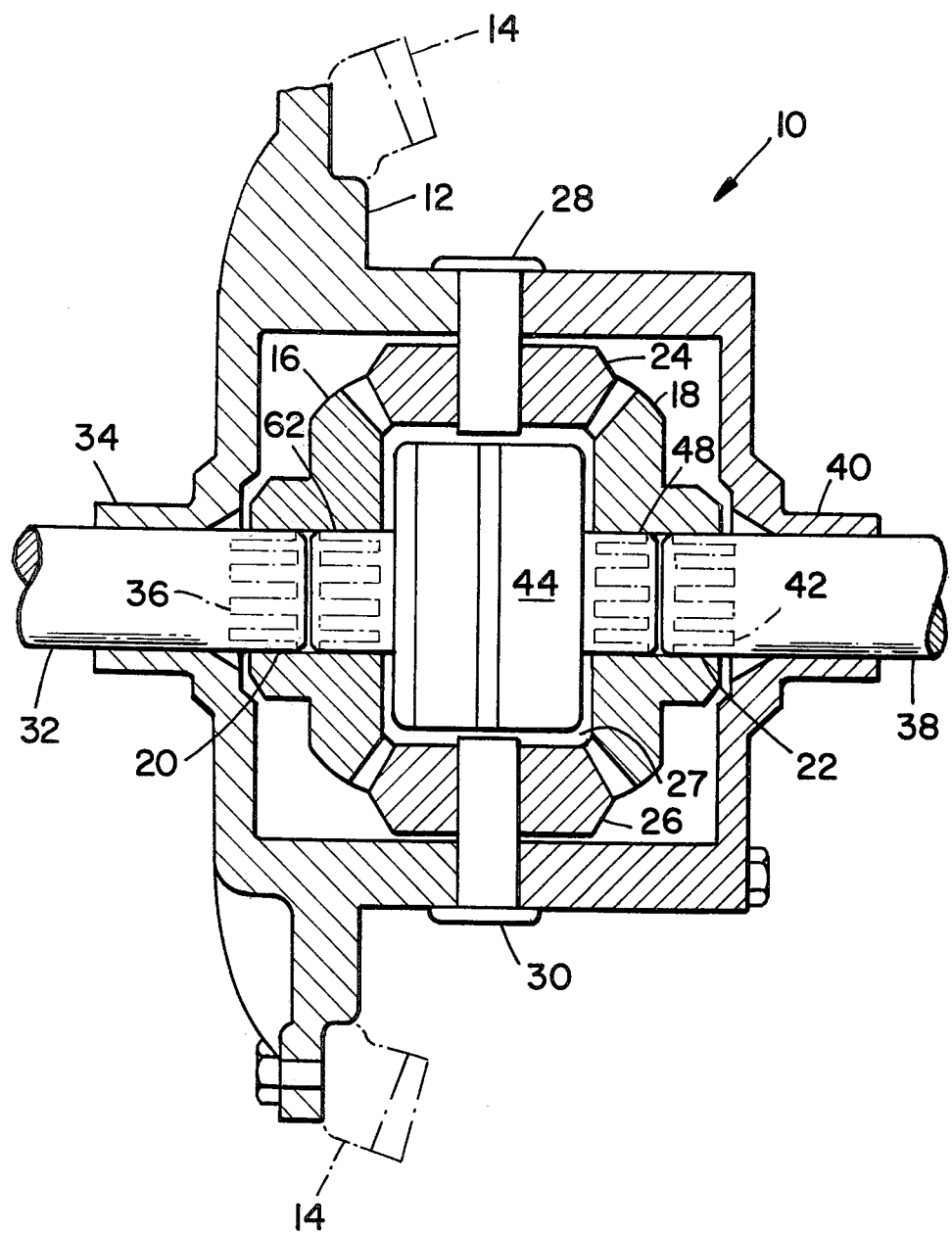
FIG_1

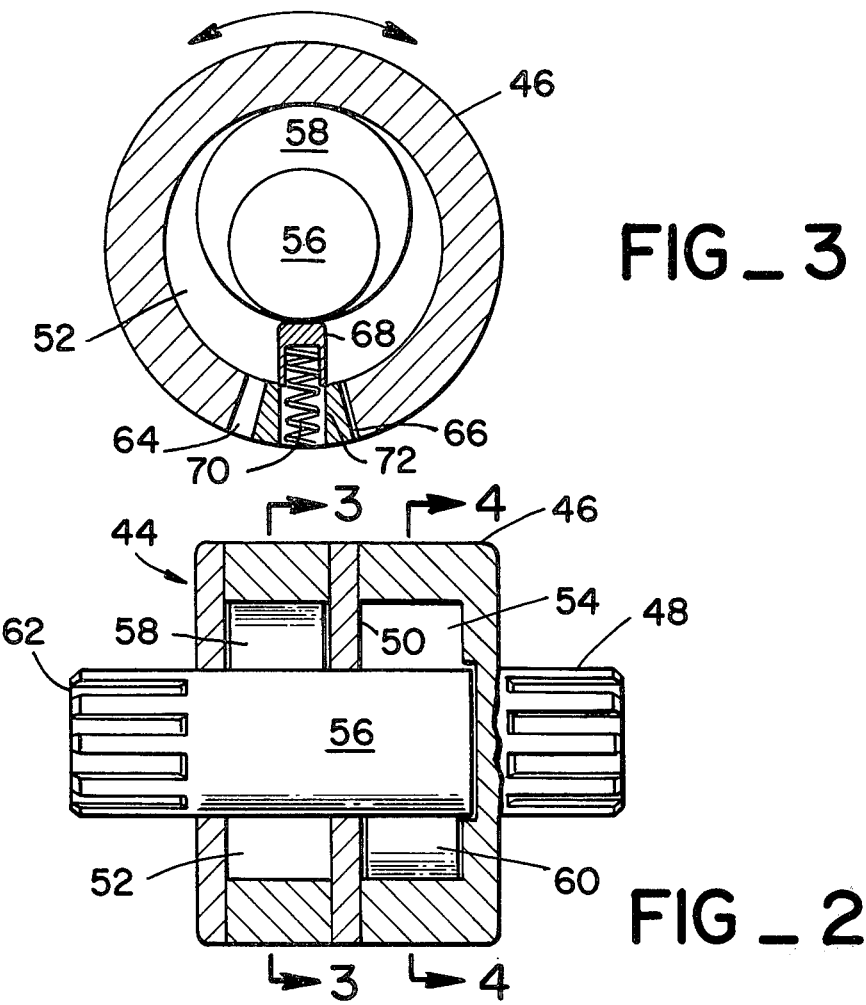
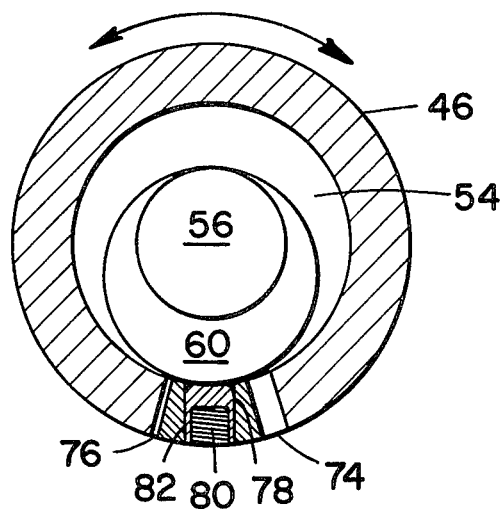
FIG_3
FIG_2
FIG_4

DIFFERENTIAL TRANSMISSION WITH LIMITED TORQUE TRANSMITTER

BACKGROUND OF THE INVENTION

This invention relates to a differential transmission for controlling the rotational speed of a pair of members and, more particularly, to an improvement in differential transmissions of the type which transmit internal resistance torque to the members, such as wheel axles.

Differential transmissions may be used in many fields where pairs of members are rotated. Typically, conventional differential transmissions are utilized to allow the driving wheels of a motor vehicle to rotate at different speeds while dividing the driving torque equally between the wheel axles and, hence, the wheels. This function is desirable such as when the vehicle is making a turn or cornering. During this turning condition, the outer wheel will rotate at a different, i.e., faster, speed than the inner wheel.

While the conventional differential transmissions perform the above function satisfactorily, they do have an important disadvantage. As is well known, when the vehicle is being driven, it is possible that one of the driving wheels will lose traction and spin, while the other wheel remains stationary, whereby the vehicle can become immobilized. This normally can occur when driving over low tractive surfaces such as mud, ice or snow. When the one wheel slips, it cannot absorb torque and no torque can be supplied to the other or stationary wheel. Conventional differential transmissions are deficient in that they do not provide at least a minimum resistance torque to eliminate wheel slippage on low tractive surfaces.

Other differential transmissions, known as limited slip differentials, have been developed to overcome the disadvantage of the above-noted conventional differential transmission. For example, one of these limited slip differentials, is described in U.S. Pat. No. 3,186,258, isued June 1, 1965. Essentially, limited slip differentials always provide at least a minimum amount of resistance torque internally of the differential in the form of internal friction. This internal friction is obtained by preloading or biasing the differential so that the torque absorption by either wheel cannot fall below a predetermined amount. This preloading or biasing provides internal torsional resistance to speed differentiation between the wheels, thereby insuring that a minimum torque is delivered to each wheel under all driving conditions.

A disadvantage with limited slip differentials is that the internal resistance or friction is present during all driving conditions irrespective of the speed differential between the wheels. When driving over normal or good tractive conditions in a straight path or when turning the vehicle on such normal tractive conditions, this internal friction is not required. Yet, during these driving conditions the vehicle must expend more energy to overcome this friction even though the friction is not required at this time. Also, undesirable heat and noise are produced as a result of this friction. Moreover, because the wheels of a vehicle having the conventional limited slip differential are frictionally coupled together through this differential at all times, the brakes will often lock up when applied, resulting in skidding.

SUMMARY OF THE INVENTION

It is an object of the present invention to provide a novel differential transmission.

It is another object of the present invention to provide a differential transmission which overcomes the above disadvantages of the prior limited slip differentials.

Another object of the present invention is to provide a differential transmission which develops internal torsional resistance to speed differentiation only when the speed ratio of the rotatable members exceeds a predetermined amount.

A yet further object of the present invention is to provide a differential transmission which allows the driving wheels of a vehicle to rotate at different speeds while dividing the driving torque equally between them when driving over normal tractive conditions, but which develops internal torsional resistance to deliver torque to both wheels when one wheel would otherwise slip.

These and other objects of the present invention are obtained through the use of a differential transmission which includes means for allowing a pair of rotatable members to rotate at different speeds and means for developing resistance torque only when the speed differential between the members exceeds a predetermined ratio.

BRIEF DESCRIPTION OF THE DRAWINGS

FIG. 1 is a sectional view of a differential transmission of the present invention.

FIG. 2 is a view, in cross-section, of a limited torque transmitter of the present invention.

FIG. 3 is a view taken along lines 3—3 of FIG. 2.

FIG. 4 is a view taken along lines 4—4 of FIG. 2.

DETAILED DESCRIPTION OF THE DRAWINGS

FIG. 1 illustrates a differential transmission 10 having a rotational differential casing 12. A ring gear 14 shown in phantom lines is bolted to the casing 12 to transmit power drive from a vehicle engine (not shown) through a drive shaft (not shown) in a conventional manner. The casing 12 would be enclosed within a conventional differential transmission housing (now shown) and submerged in transmission lubricant fluid.

Interiorly of the casing 12 is a pair of side gears 16 and 18 having, respectively, splined openings 20 and 22 therethrough. Also positioned interiorly of the casing 12 is a pair of pinion gears 24 and 26 which are in meshing engagement with the side gears 16 and 18. A pinion shaft 28 extends through the casing 12 and pinion gear 24 to rotatably carry the gear 24. A pinion shaft 30 extends through the casing 12 and pinion gear 26 to rotatably carry the gear 26. Since the casing 12 is submerged in the lubricant fluid, in a conventional manner this fluid will flow to the interior space 27 of the gears 16, 18, 24 and 26.

An axle shaft 32 extends through a hub 34 of the casing 12 into the opening 20. Shaft 32 is coupled to the side gear 16 by splines 36 which engage or mesh with mating splines at the opening 20. Shaft 32 is the axle for one of the drive wheels (not shown) of the vehicle.

An axle shaft 38 extends through a hub 40 of the casing 12 into the opening 22 of the side gear 18. Shaft 38 is coupled to the gear 18 by splines 42 which engage or mesh with corresponding splines at the opening 22.

Shaft 38 is the drive axle for the other of the drive wheels (not shown).

The above description of the differential transmission 10 is essentially similar to conventional differential transmissions. That is, the above-described differential transmission 10 will allow the driving wheels (not shown) to rotate at different speeds, such as when turning or cornering the vehicle, while dividing the driving torque equally between the shafts 32 and 38 and, hence, the driving wheels when driving over normal tractive surfaces. The above-described differential transmission 10 also will permit the wheels to rotate at the same speed when driving in a straight path over normal tractive surfaces.

A limited torque transmitter 44 shown in FIG. 1, is used to develop internal torsional resistance only under certain conditions described below for purposes of insuring that torque is delivered to shafts 32 and 38 during such conditions. As shown in FIGS. 2-4, the limited torque transmitter 44 has a rotatable casing 46 with a splined hub 48 at one end. Casing 46 includes a circular flange 50 that extends inwardly to divide the interior of the casing 46 into a pair of chambers or cylinders 52 or 54.

A rotatable shaft 56 extends interiorly of the casing 46 into the cylinders 52 and 54. Shaft 56 has a blade 58 that extends to the inside diameter of the casing 46 forming the cylinder 52. Another blade 60 on the shaft 56 extends to the inside diameter of casing 46 forming the cylinder 54. Shaft 56 has a splined end 62 opposite the splined hub 48 and outside the casing 46. As shown in FIG. 1, casing 46 is coupled to the side gear 18 by the splined hub 48 meshing with the mating splines in the opening 22. Shaft 56 is coupled to the side gear 16 by the end 62 meshing with the mating splines in the opening 20.

With reference to FIG. 3, the casing 46 has a fluid passage or inlet 64 which communicates the transmission fluid in which the casing 12 would be submerged with the cylinder 52. Casing 46 has a fluid passage or outlet 66 which also communicates the cylinder 52 with the transmission fluid. A divider 68 divides cylinder 52 and is spring biased against the shaft 56 by a spring 70 disposed within a bore 72 of the casing 46. As, for example, shaft 56 rotates in a clockwise direction shown in FIG. 3, transmission fluid will be drawn into cylinder 52 through inlet 64 on one side of the divider 68 and be forced out the cylinder 52 through the outlet 66 on the other side of the divider 68 by the blade 58.

With reference to FIG. 4, casing 46 also has fluid passage or inlet 74 which communicates the transmission fluid with the cylinder 54. A fluid passage or outlet 76 communicates the cylinder 54 with the transmission fluid. Cylinder 54 also is divided by a divider 78 that is spring biased against the shaft 56 by a spring 80 disposed within a bore 82 of the casing 46. As the shaft 56 rotates in the counterclockwise direction, as viewed in FIG. 4, transmission fluid will be drawn into cylinder 54 via the inlet 74 on one side of the divider 78. Simultaneously, fluid in the cylinder 54 on the other side of divider 78 will be forced out through the outlet 76 by the rotating blade 60.

As can be seen from FIGS. 3 and 4, and assuming the shaft 56 is rotating clockwise, the position of the rotatable shaft 56 at this particular time is such that in cylinder 52 fluid is being drawn in via inlet 64 to one side of blade 58 and being forced out via outlet 66 by the other side of blade 58, while both inlet 74 and outlet 76 are closed due to the position of blade 60. If the blades 58 and 60 are rotated in a clockwise direction 180° from the positions shown by so rotating shaft 56, inlet 64 and outlet 66 would be closed, while some fluid will be drawn into cylinder 54 actually through outlet 76 and forced out cylinder 54 through inlet 74 by blade 60. Blade 58 and blade 60 are positioned 180° apart on the shaft 56 to balance the weight distribution of these blades. It can be seen that torque transmitter 44, in the specific embodiment shown, thus constitutes a rotary pump.

As can be seen by comparing FIGS. 3 and 4, inlet 64 and outlet 76 are on the same side of the respective dividers 68 and 78, while outlet 66 and inlet 74 are on the same side of the respective dividers 68 and 78. In other words, in relation to either direction of rotation of the shaft 56, e.g. clockwise, the inlet 64 and outlet 66 are positioned oppositely to the inlet 74 and outlet 76.

The size of inlet 64 is larger than the size of outlet 66, and the size of inlet 74 is larger than the size of outlet 76. Thus, each cylinder 52 and 54 has an unrestricted fluid intake via inlets 64 and 74 relative to restricted outlets 66 and 76. The actual size of the outlet 66 and outlet 76 is important to the development of internal torsional resistance, as will be described below.

In operation, assume that the vehicle is being driven in a straight forward direction over a normal tractive road, whereby in a conventional manner there will be no differential rotation between shaft 32 and shaft 38 provided by differential transmission 10. The ring gear 14 will rotate the casing 12 about the aligned axes of shafts 32 and 38. Casing 12 will drive the pinion gears 24 and 26 about these axes to drive also side gears 16 and 18 about these axes. Gears 16 and 18 thus will rotate at the same speed to drive shafts 32 and 38 at the same speed. Also, gear 16 will drive shaft 56 while gear 18 will drive casing 46 at the same rotational speed. Limited torque transmitter 44 will not be pumping any transmission fluid out of cylinders 52 and 54 at this time because there is no relative rotation between shaft 46 and casing 46. Similarly, the above operation will occur if the vehicle is being driven in a straight reverse direction over a normal tractive road.

Assume the vehicle is now being driven forwardly over a normal tractive road and is being turned or cornered. Also assume that shaft 32 is coupled to the outer wheel, and that the forward direction is the clockwise direction shown in FIGS. 3 and 4. The differential transmission 10 will allow shaft 32 to rotate faster than shaft 38. This differential rotation between shaft 32 and shaft 38 is accomplished in a conventional manner by having ring gear 14 drive casing 12 which again drives pinion gears 24 and 26 about the aligned axes of shafts 32 and 38. During this turning, pinion gears 24 and 26 also will rotate about their respective pinion shafts 28 and 30 as well as about side gear 18. This action of pinion gears 24 and 26 will drive side gear 16 faster than side gear 18, whereby shaft 32 will rotate faster than shaft 38.

From FIGS. 2-4, it can be seen that since shaft 32 is being driven or rotated faster than shaft 38, then shaft 56 of limited torque transmitter 44 will be driven faster than casing 46. Consequently, as seen in FIG. 3, fluid will be drawn into cylinder 52 through large inlet 64 and discharged or pumped out of cylinder 52 through small outlet 66 by blade 58. The size of outlet 66 is such that for turning over normal tractive conditions, blade 58 can pump fluid from cylinder 52 through outlet 66 without there being any fluid pressure buildup in cylinder 52. Thus, during turning over a normal tractive condition there will be no torsional resistance developed internally of transmitter 44 and hence no transfer of torque between shaft 56 and casing 46. From FIG. 4, it can be seen that during this turning, passage 76 actually becomes a fluid inlet for cylinder 54 and passage 74 a fluid outlet. However, since passage 76 is small, very little fluid is introduced into cylinder 54 and, hence, essentially there is no pumping of fluid out passage 74 by blade 60. Since there is thus no fluid pressure buildup in cylinder 54, there is again no torsional resistance developed internally of transmitter 44.

Similarly, if the vehicle is being driven in reverse over a normal tractive road and being cornered with shaft 32 being coupled to the outer wheel, then shaft 56 will rotate faster than casing 46, but in a counterclockwise direction as viewed in FIGS. 3 and 4. Now, the pumping action will occur in cylinder 54 rather than cylinder 52. Transmission fluid will be drawn into cylinder 54 through large inlet 74 and pumped out cylinder 54 through small outlet 76 by blade 60. Outlet 76 is sized in the same manner as passage 66 so that under this driving condition no fluid pressure builds up in cylinder 54. Very little fluid will be drawn into cylinder 52 through small passage 66 and hence essentially there is no pumping action when this fluid flows out passage 64.

Assume now that the vehicle is being driven over a normal tractive road, either forwardly or in reverse, and is being turned so that shaft 38 is coupled to the outer wheel. Consequently, now casing 46 of transmitter 44 will rotate faster than shaft 56 in either a clockwise or counterclockwise direction. From FIGS. 3 and 4 it can be seen that if casing 46 is rotating faster than shaft 56 in a clockwise direction, then the above-described pumping action will occur in cylinder 54 and not in cylinder 52. If casing 46 is rotating faster than shaft 56 in a counterclockwise direction, then this pumping action will occur in cylinder 52 and not cylinder 54. The sizing of passages 66 and 76 is such that for these normal driving conditions, there will be no torsional resistance developed internally of transmitter 44 and, hence, no transfer of torque between shaft 56 and casing 46.

Assume now that the vehicle is being driven in a forward direction over a road that is not normally tractive, e.g., a road that is icy. Also assume that because of this icy road condition the wheel coupled to shaft 32 has no traction and slips while the wheel coupled to shaft 38 is stationary and has maximum traction. Consequently, at this time the speed differential between the shaft 32 and shaft 38 exceeds the speed differential under normal tractive road conditions when the vehicle is being turned or cornered. Therefore, as viewed in FIG. 3, shaft 56 tends to rotate very fast in a clockwise direction while casing 46 tends to remain stationary. However, at this time fluid pressure will build up in cylinder 52. This is because the restrictive passage 66 prevents blade 58 from pumping fluid out of the cylinder 52 as quickly as it can under normal tractive road conditions when making a turn. Consequently, this pressure buildup of fluid will provide an internal torsional resistance to the speed differential between shaft 32 and shaft 38 and provide a torque on the shaft 56, a limited amount of which will also be transmitted through the fluid to the casing 46. As a result, this torque on shaft 56 and casing 46 is used to reduce the speed differential between shaft 32 and shaft 38 and drive both wheels.

Similarly, assume the vehicle is being driven in the reverse direction over the icy road. Also assume that the wheel coupled to shaft 32 again slips and the wheel coupled to shaft 38 is stationary. Consequently, at this time also the speed differential between shaft 32 and shaft 38 exceeds the speed differential under normal tractive road conditions when the vehicle is being turned or cornered.

Therefore, shaft 56 will now rotate in a counterclockwise direction, as seen in FIG. 4, faster than casing 46 which tends to remain stationary. Fluid pressure now will build up in cylinder 54 because restrictive passage 76 prevents blade 60 from pumping fluid out of cylinder 54 as quickly as it can under normal road tractive conditions when making a turn. This fluid pressure rise in cylinder 54 will provide or develop an internal torsional resistance to the speed differential between shaft 32 and shaft 38 and provide a torque on shaft 56, a limited amount of which will be transmitted to casing 46 through the fluid in cylinder 54. Thus, again, the speed differential between shaft 32 and shaft 38 will be reduced and the torque on shaft 56 and casing 46 utilized to drive the wheels.

It can now be seen that if the wheel coupled to shaft 38 slips, either in a forward or reverse direction, while the wheel coupled to shaft 32 remains stationary, that torsional resistance will be developed internally of transmitter 44 and torque will be coupled between casing 46 and shaft 56. This is as a result of casing 46 rotating faster than shaft 56 under normal tractive road conditions to build up fluid pressure either in cylinder 52 or cylinder 54 due to the sizing of passages 66 and 76.

Thus, the limited torque transmitter 44, particularly passages 66 and 76, is constructed based on the normal differential speed ratio which would occur under normal driving conditions. That is, under normal, i.e., not icy, etc., driving conditions, the differential speed ratio for a particular vehicle will not exceed a known value. The actual size of passages 66 and 76 can be made such that until this speed ratio is reached, no fluid pressure will build up in cylinders 52 and 54. If the speed ratio exceeds this known value, such as when one wheel slips, then the size of the passages 66 and 76 will be such as to develop this pressure buildup and, hence, internal torsional resistance.

The actual size of the passages 66 and 76 will depend on the overall size of the transmitter 44 which, itself, depends on the size of the vehicle in which it is to be installed. Also, it can now be appreciated that the level of lubricant fluid in the casing 12 should be high enough, as viewed in FIG. 1, such that fluid is always available at the intake passages 64 and 74 for the required pumping action.

Furthermore, when one cylinder 52 or 54 is pumping fluid and building up fluid pressure, as described above, the other cylinder 52 or 54, which is not drawing in much fluid, is creating a vacuum. The pressure buildup in the one cylinder results in a "positive" torque transmission in which this pressure "pushes" on the shaft 56 and casing 46. The other cylinder creating the vacuum, results in a "pulling" action on the shaft 56 and casing 46. Thus, both cylinders 52 and 54 transmit torque between shaft 56 and casing 46 at this time, but essentially all of the torque transmission will occur in the cylinder 52 or 54 which creates the pressure buildup.

With the torque transmitter 44 of the present invention, the vehicle does not use any power to overcome any internal torsional resistance. Only when needed is the torsional resistance developed to transmit torque from the engine to the drive wheels. Furthermore, the present invention does not generate noise or heat due to friction as in conventional limited slip differentials which have such internal torsional resistance. Also, since the vehicle wheels are not coupled together, except when the predetermined speed ratio is reached, there will be no brake lockup causing skidding when the brakes are applied, for example, over a wet surface when it is raining.

Other aspects, objects and advantages of this invention can be obtained from a study of the drawings, disclosure and the appended claims.

What is claimed is:

1. A differential transmission for controlling the rotational speed of a pair of wheels, comprising:
   (a) a first rotatable casing having a pair of hubs;
   (b) a pair of pinion gears coupled to said first casing:
   (c) a pair of side gears having openings therethrough and being in meshing engagement with said pinion gears;
   (d) a pair of wheel axles extending, respectively, through said hubs and into said openings in meshing engagement with said side gears; and
   (e) a rotary pump including a second rotary casing forming a pair of fluid cylinders and having a first fluid inlet and a first fluid outlet in fluid communication with one of said cylinders, a second fluid inlet and a second fluid outlet in fluid communication with the other of said cylinders, a rotary shaft having a pair of blades, one of said blades extending within said one cylinder and the other of said blades extending within said other cylinder, said second casing extending into one of said openings and being in meshing engagement with one of said side gears and said shaft extending into the other of said openings and being in meshing engagement with the other of said side gears.

2. A differential transmission according to claim 1 wherein said first outlet and said second outlet are sized to build up fluid pressure in said first cylinder and said second cylinder, respectively, only after a predetermined differential speed ratio occurs between said wheel axles.

3. A differential transmission according to claim 2 wherein said first inlet and said second inlet are larger than said first outlet and said second outlet, respectively.

4. A differential transmission according to claim 3 wherein said first inlet and said first outlet are positioned oppositely with respect to said second inlet and said second outlet in relation to the direction of rotation of said shaft.

* * * * *